(12) United States Patent
Shiiyama

(10) Patent No.: US 7,880,936 B2
(45) Date of Patent: Feb. 1, 2011

(54) DYNAMIC IMAGE DIGEST AUTOMATIC EDITING SYSTEM AND DYNAMIC IMAGE DIGEST AUTOMATIC EDITING METHOD

(75) Inventor: Hirotaka Shiiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 562 days.

(21) Appl. No.: 11/389,202

(22) Filed: Mar. 27, 2006

(65) Prior Publication Data

US 2006/0164702 A1  Jul. 27, 2006

Related U.S. Application Data

(62) Division of application No. 09/503,481, filed on Feb. 14, 2000, now Pat. No. 7,075,683.

(30) Foreign Application Priority Data

Feb. 15, 1999  (JP) .................................. 11-036511
Feb. 15, 1999  (JP) .................................. 11-036514

(51) Int. Cl.
*H04N 1/387* (2006.01)
(52) U.S. Cl. ........................ 358/452; 382/232; 348/700; 358/537
(58) Field of Classification Search ......... 358/1.1–1.13, 358/537, 452; 382/232; 348/14.1–14.16, 348/135, 218.1, 700
See application file for complete search history.

(56) References Cited

U.S. PATENT DOCUMENTS

| 4,319,286 | A |  | 3/1982 | Hanpachern | ................. 358/906 |
| 5,204,706 | A |  | 4/1993 | Saito | ........................... 352/129 |
| 5,404,174 | A | * | 4/1995 | Sugahara | .................... 348/700 |
| 5,537,530 | A |  | 7/1996 | Edgar et al. | .................. 345/723 |
| 5,758,181 | A |  | 5/1998 | Becker | ....................... 358/1.17 |
| 5,805,733 | A |  | 9/1998 | Wang et al. | .................. 382/232 |
| 5,818,439 | A | * | 10/1998 | Nagasaka et al. | ............. 725/87 |
| 6,014,183 | A |  | 1/2000 | Hoang | ......................... 348/702 |
| 6,195,458 | B1 | * | 2/2001 | Warnick et al. | ............. 382/173 |

(Continued)

FOREIGN PATENT DOCUMENTS

JP    9-233422    9/1997

(Continued)

OTHER PUBLICATIONS

Office Action dated Feb. 13, 2009 in JP 11-036514.

*Primary Examiner*—Mark K Zimmerman
*Assistant Examiner*—Dung D Tran
(74) *Attorney, Agent, or Firm*—Fitzpatrick, Cella, Harper & Scinto

(57) ABSTRACT

An image processing section 10 calculates degree of similarity among a plurality of image frames of dynamic image data, determines scene-change frames based on the calculated degree of similarity, and performs automatic editing and preparation of a digest dynamic image of the dynamic image data by merging a specified duration of frames, giving priority to scenes whose scene-change frame has a low degree of similarity to an immediately preceding frame or some preceding frames, or by merging, from scenes delimited by a scene change, a specified duration of frames having a degree of similarity in keeping with the user's indication of whether or not a "little change digest" or a "much change digest" is to be prepared.

35 Claims, 18 Drawing Sheets

U.S. PATENT DOCUMENTS

| | | | |
|---|---|---|---|
| 6,381,278 B1 * | 4/2002 | Shin et al. | 375/240.16 |
| 6,600,491 B1 * | 7/2003 | Szeliski et al. | 345/473 |
| 6,611,268 B1 * | 8/2003 | Szeliski et al. | 345/473 |
| 6,751,354 B2 * | 6/2004 | Foote et al. | 382/224 |
| 6,766,037 B1 * | 7/2004 | Le et al. | 382/107 |
| 6,977,963 B1 | 12/2005 | Shiyama | 375/240.24 |
| 7,016,540 B1 * | 3/2006 | Gong et al. | 382/225 |
| 7,075,683 B1 * | 7/2006 | Shiiyama | 358/452 |
| 7,092,040 B1 * | 8/2006 | Watanabe | 348/700 |
| 7,296,231 B2 * | 11/2007 | Loui et al. | 715/723 |
| 7,334,191 B1 * | 2/2008 | Sivan et al. | 715/723 |
| 7,372,991 B2 * | 5/2008 | Chen et al. | 382/173 |
| 7,383,508 B2 * | 6/2008 | Toyama et al. | 715/723 |
| 7,526,725 B2 * | 4/2009 | Forlines | 715/723 |

FOREIGN PATENT DOCUMENTS

| | | |
|---|---|---|
| JP | 10-327386 | 12/1998 |

\* cited by examiner

FIG. 5

| SCENE CHANGE ID | INITIAL FRAME | FINAL FRAME | MAGNITUDE | BLANK FLAG |
|---|---|---|---|---|
| 0 | 0 | 9 | 100 | 1 |
| 1 | 10 | 15 | 50 | 0 |
| 2 | 16 | 35 | 80 | 0 |

FIG. 6

| SCENE NUMBER | INITIAL FRAME | FINAL FRAME |
|---|---|---|
| 0 | 10 | 15 |
| 1 | 30 | 35 |

FIG. 12

| SCENE CHANGE ID | INITIAL FRAME | FINAL FRAME | MAGNITUDE | BLANK FLAG | INITIAL FRAME OF LITTLE CHANGE PARTIAL SCENE | AVG. SIMILARITY OF LITTLE CHANGE PARTIAL SCENE | INITIAL FRAME OF MUCH CHANGE PARTIAL SCENE | AVG. SIMILARITY OF MUCH CHANGE PARTIAL SCENE |
|---|---|---|---|---|---|---|---|---|
| 0 | 0 | 99 | 100 | 1 | 50 | 95 | 80 | 65 |
| 1 | 100 | 159 | 50 | 0 | 110 | 87 | 130 | 70 |
| 2 | 160 | 350 | 80 | 0 | 300 | 99 | 170 | 60 |

FIG. 15

| SCENE NUMBER | INITIAL FRAME | FINAL FRAME |
|---|---|---|
| 0 | 50 | 55 |
| 1 | 300 | 305 |

DYNAMIC IMAGE DIGEST AUTOMATIC EDITING SYSTEM AND DYNAMIC IMAGE DIGEST AUTOMATIC EDITING METHOD

This application is a divisional application of application Ser. No. 09/503,481, filed Feb. 14, 2000, which is incorporated herein by reference.

FILED OF THE INVENTION

The present invention relates to an image processing system and to an image processing method.

BACKGROUND OF THE INVENTION

Conventionally, to determine whether or not a dynamic image (moving picture) is one the viewer wishes to view, it was necessary to perform accelerated replay, or to fast-forward and then replay.

However, both of these methods are inconvenient for the user, because replay required bothersome operations, and there are also problems with the quality of replayed images.

SUMMARY OF THE INVENTION

The present invention has been made in order to resolve the foregoing problems, and it is an object hereof to provide a user with means to view the contents of a desired dynamic image appropriately and in a short time, and means to search for a dynamic image the user wishes to use.

As means for attaining the foregoing object, the present invention is structured, for example, as follows.

The present invention includes calculating means for calculating the degree of similarity among a plurality of image frames of dynamic image data, determining means for determining scene-change frames based on degree of similarity calculated by the calculating means, and dynamic image means which perform automatic editing and preparation of a digest dynamic image of the dynamic image data by merging from each scene delimited by a scene change frames for a specified duration, or a specified duration of frames having a low degree of similarity with an immediately preceding frame.

Further, the present invention may also include detecting means for detecting a blank scene, and exception processing means for performing exception processing in which an initial image frame after a blank scene detected by the detecting means at the beginning of the dynamic image, said blank scene is always treated as a scene-change frame.

Further, the exception processing means may also perform exception processing in which a final image frame after a blank scene detected by the detecting means at the end of the dynamic image has been excluded is always treated as a scene-change frame. The exception processing means may also perform exception processing in which, when a time difference between two scene-change frames in close proximity is less than the foregoing specified duration, frames from the scene-change frame of the first scene through a frame of the specified duration from the scene-change frame of the second scene are treated as the result of merging of the scene-change frames of the two scenes.

The exception processing means may also perform exception processing which, when the scene-change frame of a scene to be merged falls within a specified duration from the scene-change frame of the previous scene, instead of merging frames for a specified duration, only merges frames through the scene-change frame of the next scene.

Further, the dynamic image means may, on receipt of instructions to prepare a much change digest, merge a specified duration of frames within a scene which have a low degree of similarity with preceding frames.

In addition, the present invention may include calculating means for calculating a degree of similarity among a plurality of image frames of dynamic image data, determining means for determining a scene-change frame based on the degree of similarity calculated by the calculating means, and dynamic image means which perform automatic editing and preparation of a digest dynamic image of the dynamic image data by merging, within a scene delimited by a change of scene, a specified duration of frames having a low degree of similarity with preceding frames.

Further, the dynamic image means may, on receipt of instructions to prepare a quiet digest, merge a specified duration of frames within a scene which have a high degree of similarity with an immediately preceding frame.

Further, the present invention may also include detecting means for detecting a blank scene, and exception processing means for performing exception processing in which frames for a specified duration from an initial image frame after a blank scene detected by the detecting means at the beginning of the dynamic image has been excluded are always incorporated in the digest.

Further, the exception processing means may also perform exception processing in which frames for a specified duration before a final image frame after a blank scene detected by the detecting means at the end of the dynamic image has been excluded are always incorporated in the digest. The exception processing means may also perform exception processing in which, when a time difference between two scene-change frames in close proximity is less than the foregoing specified duration, frames from the scene-change frame of the first scene through a frame the specified duration from the scene-change frame of the second scene are treated as the result of merging of the scene-change frames of the two scenes. Again, the exception processing means may also perform exception processing which, when the scene-change frame of a scene to be merged falls within a specified duration from the scene-change frame of the previous scene, instead of merging frames for a specified duration, only merges frames through the scene-change frame of the next scene.

Further, in the present invention, when a mode has been indicated which provides a target duration for the completed digest dynamic image, a digest having a duration in the vicinity of the target duration is prepared by first finding all of the scene-change frames of the dynamic image, and then preferentially merging into the digest scenes whose scene-change frame has a low degree of similarity to the immediately preceding frame.

Further, in the present invention, when there are few scene changes, and the digest dynamic image is more than a certain threshold value shorter than the indicated duration, a digest having a duration in the vicinity of the target duration is prepared by gradually increasing the specified duration for addition of each scene. Moreover, in the present invention, for a dynamic image for which no scene change has been detected, if there is a blank scene at the beginning of the dynamic image, the blank scene is excluded, and frames are extracted from the first non-blank scene for the target duration, and this is treated as the digest dynamic image.

Further, the present invention may comprise means which perform automatic editing and preparation of a digest dynamic image for dynamic image data by calculating degree of similarity among a plurality of frames of the dynamic image data, determining scene-change frames based on the calculated degree of similarity, and merging frames for a specified duration from each scene-change frame.

In addition, the present invention may enable a user to select and specify whether to save a digest as a file, or replay the digest and discard the data.

Other features and advantages of the present invention will be apparent from the following description with reference to the accompanying drawings, in which like reference symbols designate the same or similar parts throughout the Figures thereof.

BRIEF DESCRIPTION OF THE DRAWINGS

The accompanying drawings, which are incorporated in and constitute a part of the Specification, illustrate embodiments of the present invention and, together with the description, serve to explain the principles of the invention.

FIG. 5 is a drawing explaining scene change information according to an embodiment of the present invention.

FIG. 6 is a drawing showing an example of frame interval information according to an embodiment of the present invention.

FIG. 12 is a drawing explaining scene change information according to an embodiment of the present invention.

FIG. 15 is a drawing showing an example of frame interval information according to an embodiment of the present invention.

DETAILED DESCRIPTION OF THE PREFERRED EMBODIMENT(S)

Preferred embodiments of the present invention will be described in detail with reference to the accompanying drawings.

First Embodiment

The following will explain in detail one embodiment of the present invention with reference to the drawings. In order to enable determination, with simple control, rapidly, and with certainty, of whether or not an image is the one the user wishes to view, the present embodiment automatically produces a high-quality digest dynamic image by performing dynamic image processing in accordance with dynamic image digest data preparation algorithms (to be discussed below), thus enabling the viewer to determine whether or not the dynamic image is the one the viewer wishes to view.

Further, by making it possible to set a target duration for the digest dynamic image in systems or software which require setting a limit on the length thereof, the present embodiment makes it possible to prepare a digest dynamic image which can be stored even in cases where there are limitations on the size of a dynamic image data header or a data domain of the memory medium.

Figure 1:
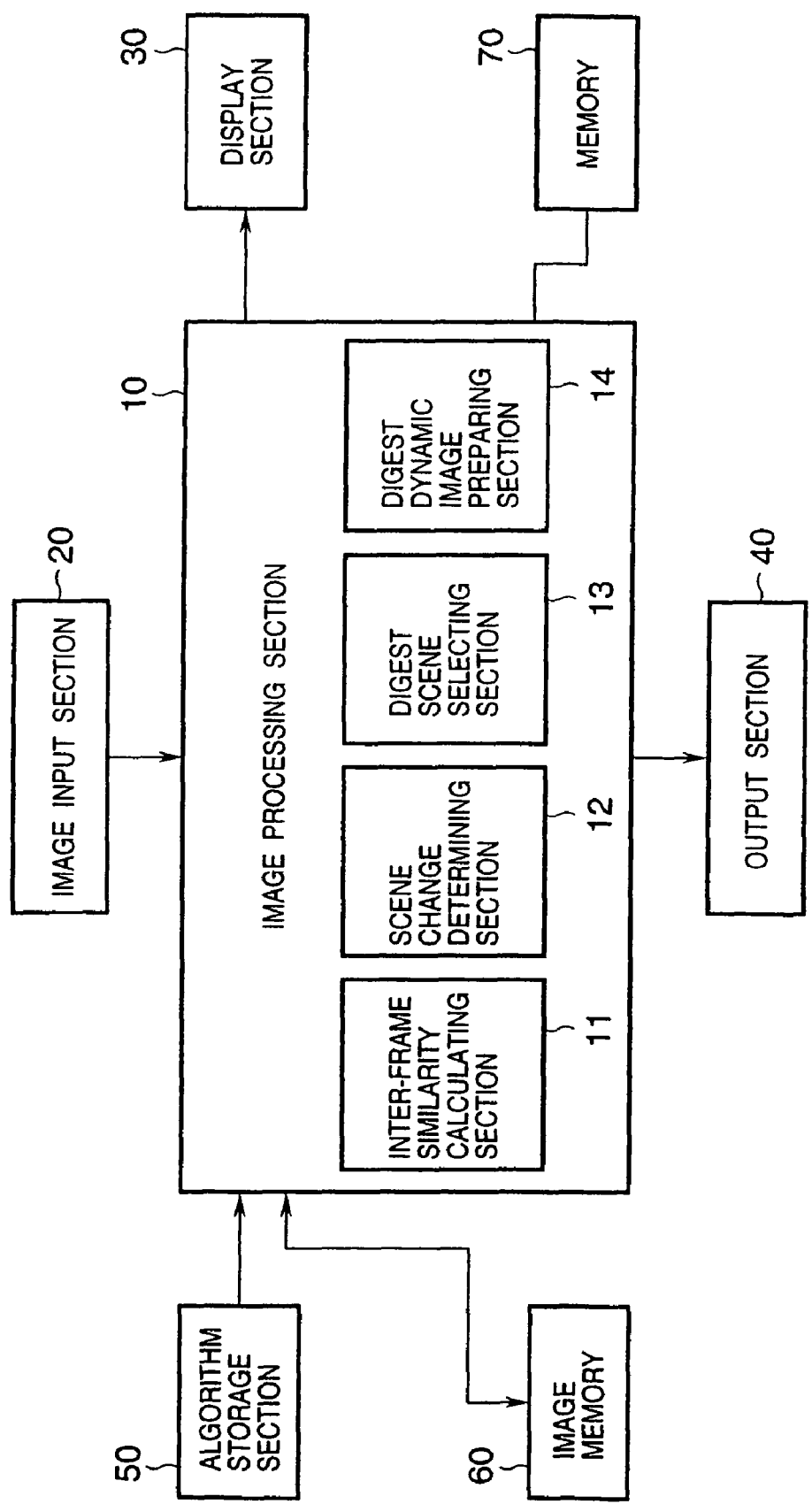
FIG. 1 is a block diagram showing the structure of an image processing device according to an embodiment of the present invention.

FIG. 1 shows the structure of an image processing device which realizes image processing according to the present embodiment. FIG. 1 is a block diagram showing the structure of the image processing device according to the present embodiment.

In FIG. 1, 10 is an image processing section which, in accordance with image processing algorithms (to be discussed below) stored in an algorithm storage section 50, processes an image, e.g. a dynamic image, inputted by an image input section 20, and 20 is an image input section which inputs dynamic images, etc.

Further, 30 is a display section for display of, e.g., images processed by the image processing section 10, and 40 is an output section which outputs for storage, e.g., images processed by the image processing section 10, and can, for example, cause processed image information to be stored as a file. 50 is an algorithm storage section which stores image processing algorithms used in image processing in the image processing section 10 and necessary control steps, and 60 is an image memory capable of storing image data to be processed by the image processing section 10.

The image processing section 10 includes an inter-frame similarity calculating section 11, a scene change determining section 12, a digest scene selecting section 13, and a digest dynamic image preparing section 14. Image processing algorithms performed by the image processing section 10 to automatically prepare a digest dynamic image will be discussed in the following embodiments.

Figure 2:
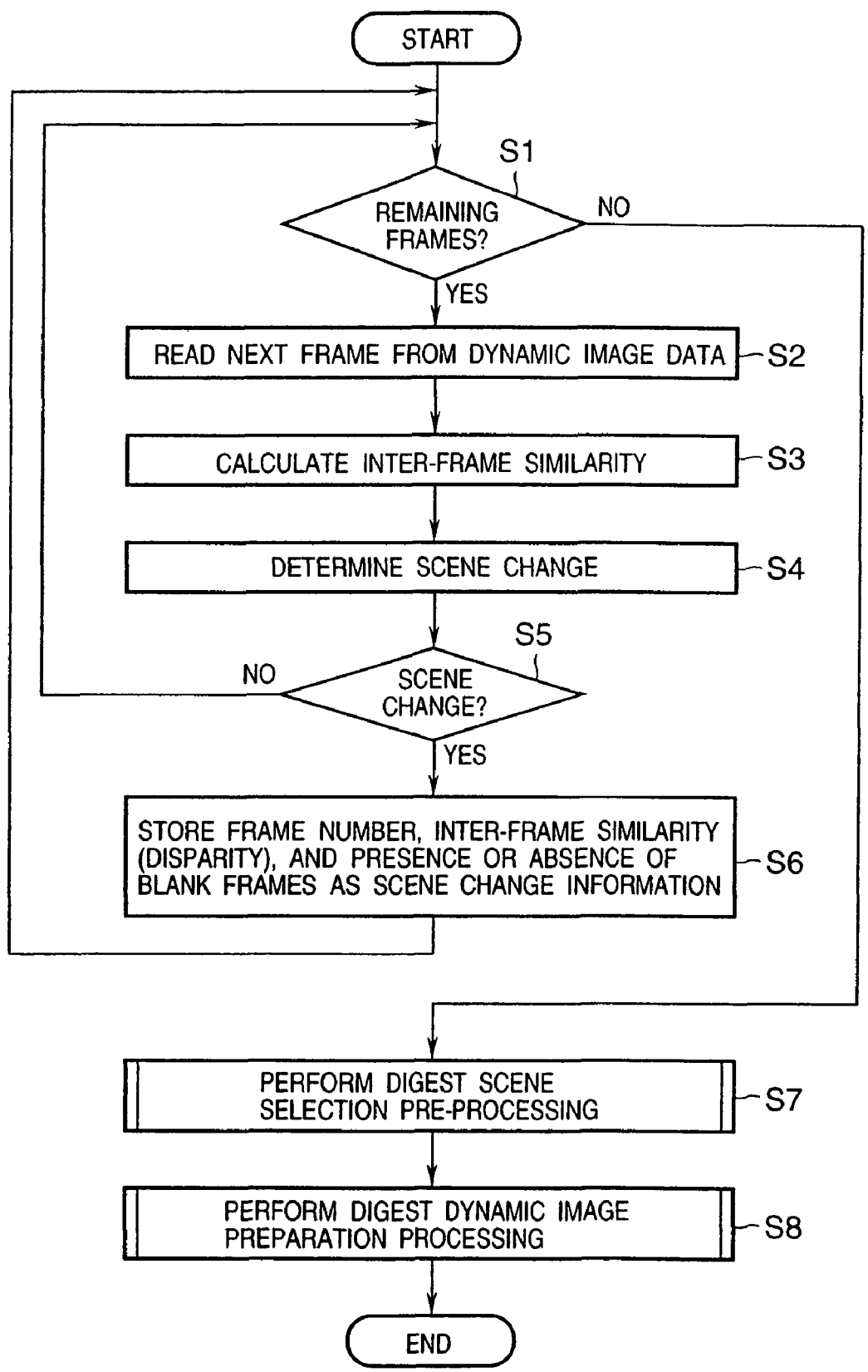
FIG. 2 is a flowchart showing, in outline, processing for automatic digest dynamic image preparation according to an embodiment of the present invention.

In the first embodiment, the image processing section 10 of the first embodiment above will perform processing to automatically prepare a digest dynamic image in accordance with an image processing algorithm shown in FIG. 2. FIG. 2 is a flowchart showing, in general form processing for automatic digest dynamic image preparation according to the present embodiment.

In automatic digest dynamic image preparation processing according to the present embodiment, first, dynamic image information is inputted from the image input section 20. Upon input of dynamic image information to be confirmed, the image processing section 10 begins processing for confirmation of the dynamic image, and proceeds to step S1 in FIG. 2.

First, in step S1, processing is carried out to read one frame at a time from the dynamic image for which a digest is to be prepared, and it is then determined whether or not there are remaining frames to be processed. If there are remaining frames, processing proceeds to step S2, where the next frame is read, and then to step S3, where the inter-frame similarity calculating section 11 calculates the similarity between the read frame and the previous frame(s). The frame(s) preceding the read frame may be singular or plural, and thus the algorithm therefor is not particularly limited.

Then, in step S4, based on the inter-frame similarity calculation result, the scene change determining section 12 performs scene change determination processing. Then, if it is determined in step S5 that there was no scene change (that the compared frames belong to the same scene), processing returns to step S1.

If, on the other hand, it is determined in step S5 that there was a scene change, processing proceeds to step S6, where that frame is stored as a scene initial frame, and information regarding the degree of similarity (or disparity), which represents the magnitude of the scene change, and regarding whether the scene is a blank scene, are also stored. Then processing returns to step S1.

The foregoing information will be called "scene change information." The scene change information is stored, for example, in a memory 70 (see FIG. 1). FIG. 5 shows an example of scene change information. As shown in FIG. 5, initial frame, final frame, magnitude of scene change, etc. are stored in relation to each scene change number (scene change ID).

Then, when the next scene change is detected, in the processing in step S6, the immediately preceding frame is incorporated in the scene change information as the final frame of the preceding scene. When processing has been performed to the end of the dynamic image, the frame number of the final frame of the dynamic image is stored as the final frame of the final scene change information.

By performing the foregoing processing for every frame of the dynamic image, scene change frames and the similarity (or disparity), which shows the magnitude of the scene change, and the kinds of the scene (blank or no-bland or so) and average information of the similarity of the scene, can be obtained for every scene change of the dynamic image.

If the foregoing processing is performed at the time of registering the dynamic image to a dynamic image output device such as the display section 30, only the processing to be described below need be performed at the time of digest preparation. Thus digest generation is more convenient because it can be performed substantially in real time.

If, in step S1, there are no remaining frames, processing proceeds to step S7, where digest scene selection pre-processing is executed, in which scenes are selected for a digest of the dynamic image to be viewed by, for example, display on the display section 30. Then, in step S8, processing for automatic digest dynamic image preparation is performed to prepare a digest dynamic image, which is, for example, stored in the image memory 60.

Thereafter, processing for digest dynamic image replay or file conversion may be performed, whereby the digest dynamic image is replayed and, for example, displayed on the display section 30, or converted into a file and outputted to the output section 40.

Figure 3:
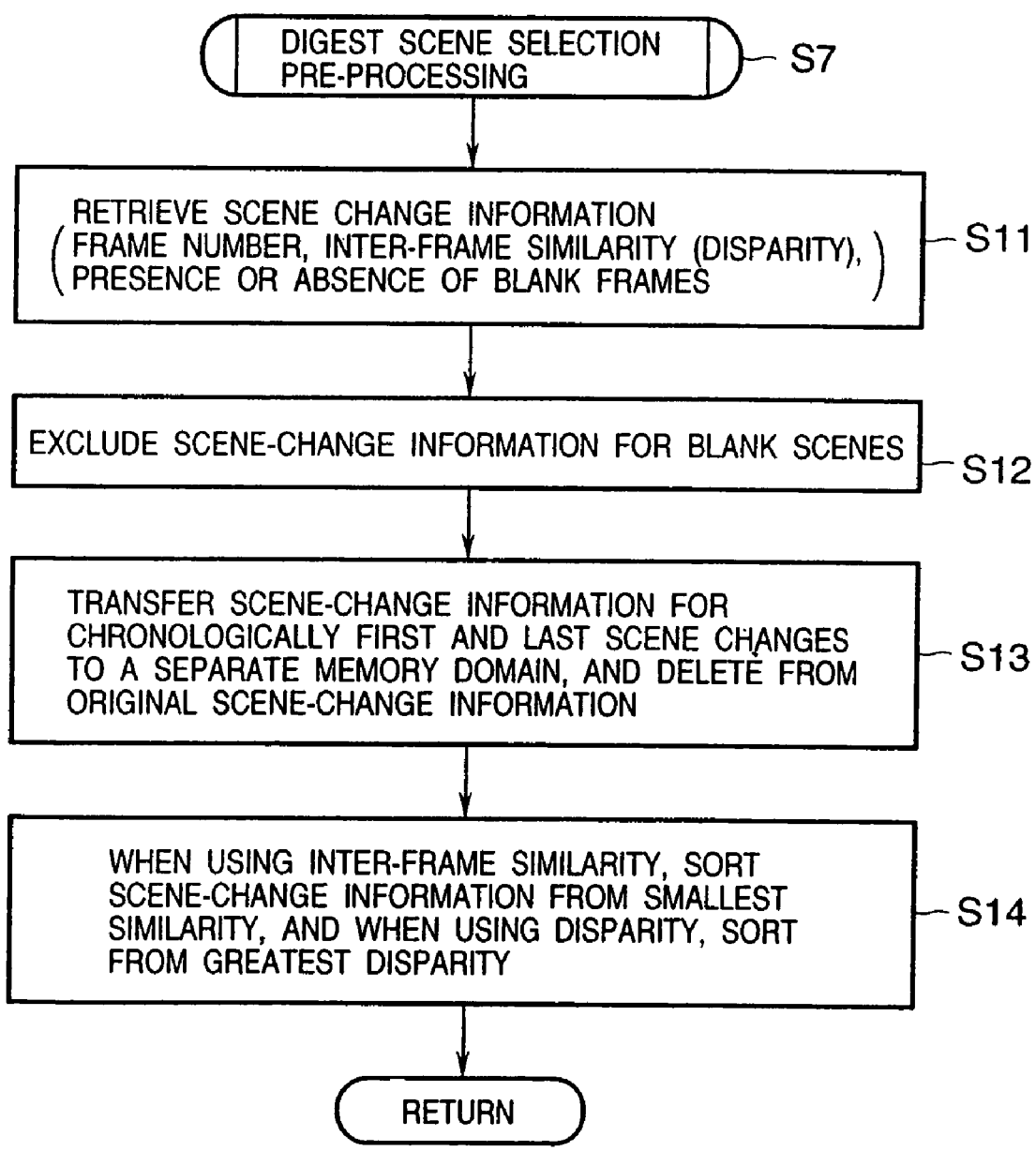
FIG. 3 is a flowchart explaining the details of the digest scene selection pre-processing of step S7 in FIG. 2.

Next, the digest scene selection pre-processing in step S7 shown in FIG. 2 will be explained in detail with reference to the flowchart in FIG. 3. FIG. 3 is a flowchart explaining the digest scene selection pre-processing shown in step S7 of FIG. 2.

First, in step S11, the scene change information, which shows frame number, inter-frame similarity (disparity), and whether there are blank frames, is retrieved. Then, in step S12, scene change information pertaining to blank scenes is excluded. Next, in step S13, of the remaining scene changes, the chronologically first and last scene changes are determined, and scene change information pertaining to the first and last scene changes is deleted from the foregoing remaining scene changes and stored in a separate domain.

Then, in step S14, based on the similarity (or disparity) expressing the magnitude of each scene change, the scene change information is sorted by magnitude of scene change, starting from the scene change of the greatest magnitude. From the point of view of similarity, the scene changes are sorted from least to the greatest, and from the point of view of disparity, from greatest to the least.

The foregoing processing for blank scene deletion, determination of first and last scene changes chronologically and deleting scene change information pertaining thereto from the remaining scene changes, and sorting by degree of similarity (or disparity) may of course be performed in parallel instead of as successive steps.

Figure 4:
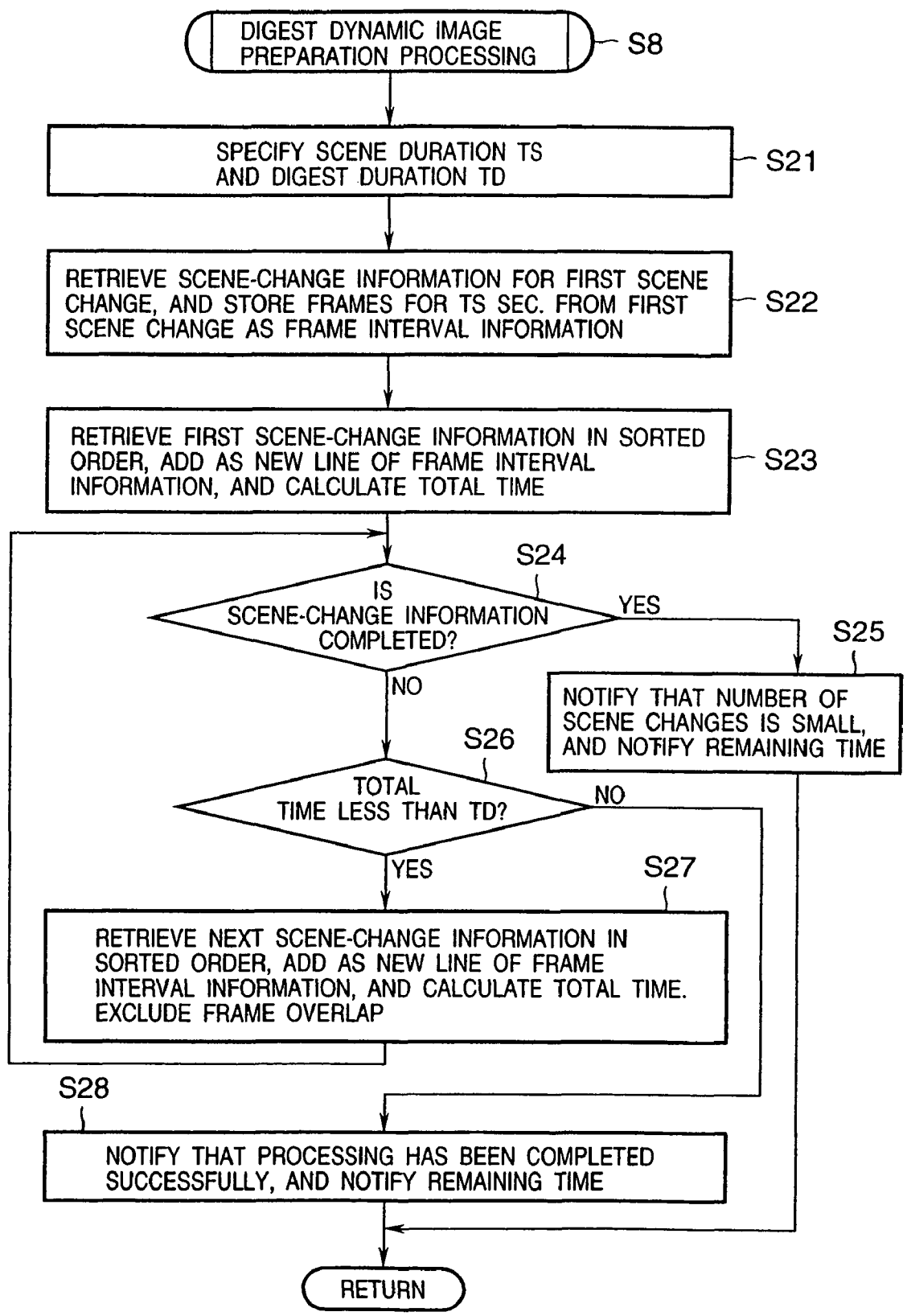
FIG. 4 is a flowchart explaining the details of processing for the automatic digest dynamic image preparation of step S8 in FIG. 2.

Next, the digest dynamic image preparation processing in step S8 shown in FIG. 2 will be explained in detail with reference to the flowchart in FIG. 4. FIG. 4 is a flowchart explaining the digest dynamic image preparation processing shown in step S8 of FIG. 2.

In the digest dynamic image preparation processing shown in FIG. 4, partial scenes are merged into a digest in accordance with the algorithm explained below. As intermediate information, frame interval information is prepared, and after a target duration has elapsed, digest scene selection preprocessing is ended, after which frames are selected based on the frame interval information and merged to generate the digest.

First, in step S21, the duration of each partial scene (TS) and the duration of the digest (TD) are specified. An optimum scene duration from the beginning of each partial scene is determined on the basis of human vision characteristics. This duration is TS sec. The duration TS is based on various psychological experiments, and is not particularly limited, but is on the order of several seconds.

Then, in step S22, scene change information for the first scene change, previously stored in a separate domain, is retrieved, and frame interval information for frames from this first scene change for a duration of TS sec. is stored.

FIG. 6 shows one example of frame interval information. As shown in FIG. 6, each line of frame interval information is made up of an initial frame number corresponding to a unique scene number and scene change of the dynamic image, and a final frame number corresponding to the final frame of the scene TS sec. in duration.

Then, in step S23, using the sorted scene change information, the first scene change information in the sorted order is retrieved and added as a new line of frame interval information, and the total time is calculated. Then, in step S24, it is checked whether or not the end of the sorted series of scene change information has been reached. If the end of the sorted series of scene change information has been reached, processing proceeds to step S25, where it is detected that, since the number of scene changes is small, processing for adding scene changes to the frame interval information has been completed for every scene change, and a notification is made that the number of scene changes is small, and also specifying the number of seconds the digest actually reached (remaining time), after which processing returns.

If, in step S24, the end of the sorted series of scene change information has not been reached, processing proceeds to step S26, where it is checked whether or not the total duration is less than (TD). If the total duration is less than (TD)−(TS), processing proceeds to step S27, where, using the sorted scene change information, partial scene information for the next scene change in the sorted series is retrieved and added as a new line of frame interval information, after which the total time is calculated, and processing returns to step S24.

Figure 7:
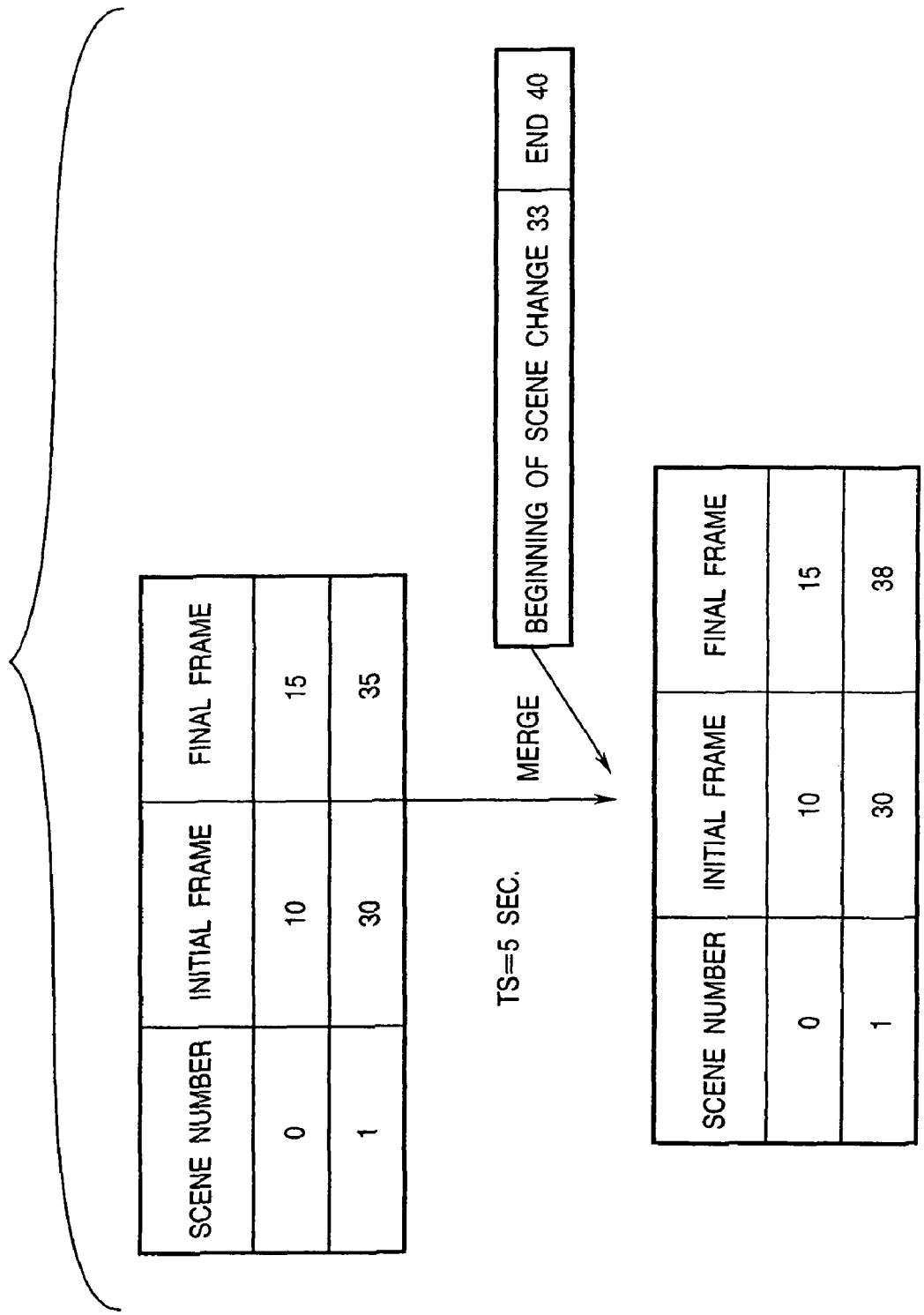
FIG. 7 is a drawing showing an example of updating frame interval information according to an embodiment of the present invention, in such a way as to eliminate scene overlap.

Incidentally, when adding to the frame interval information in the processing in step S27, frames overlapping with the frame interval information will occasionally be added. This happens, for example, when two scene changes are less than TS seconds apart. In such a case, the frame interval information is revised in such a way as to exclude scene overlap. An example is shown in FIG. 7.

Figure 8:
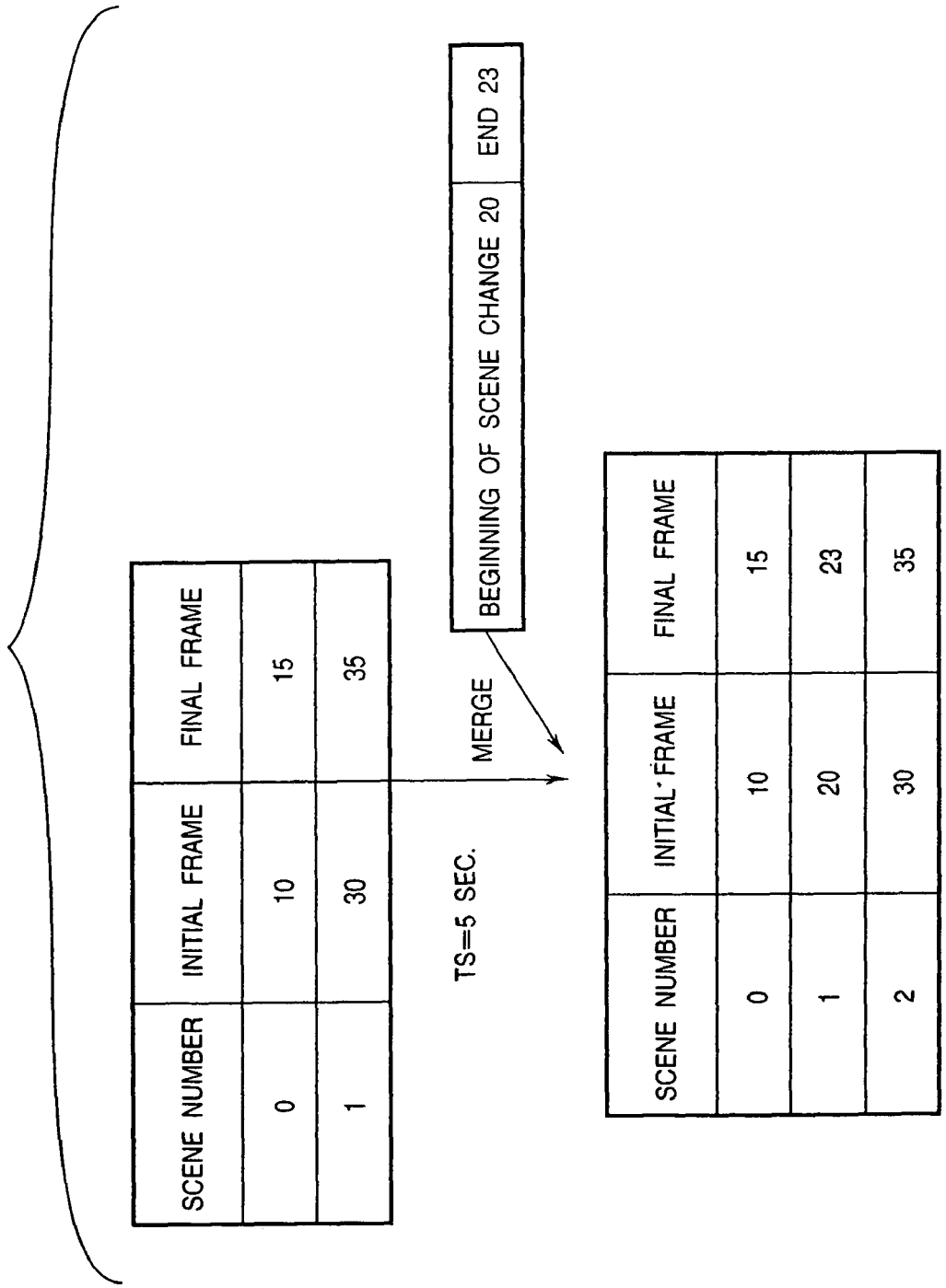
FIG. 8 is a drawing showing another example of updating frame interval information according to an embodiment of the present invention, in such a way as to eliminate scene overlap.

Again, when the duration of a scene to be added to the frame interval information is less than TS sec., as shown in FIG. 8, only frames through the final frame in the scene are added.

The duration of the digest as specified at a higher level is TD sec., and the processing of steps S24 through S27 is carried out as long as the total time occupied by the frames of the frame interval information does not exceed (TD−TS) sec. Then, when the total time exceeds (TD)−(2×TS), processing proceeds from step S26 to step S28, after which the final scene change information previously stored elsewhere is retrieved, and frames from the beginning of the final scene change for a duration of TS sec. are added to the frame interval information. Then a notification is made that processing has been successful, and also specifying the time remaining, after which processing returns.

In the foregoing explanation, when the digest is short because the number of scene changes is small, if the total duration of the digest is at least a threshold value TH seconds shorter than TD seconds, the digest dynamic image preparation processing shown in FIG. 3 may be repeated gradually increasing the duration TS of each partial scene, thereby bringing the total duration of the digest closer to a specified duration. Even if processing is repeated in this way, the number of calculations can be held to a minimum if the foregoing control is performed, and thus no problems will arise.

Further, even if there is no scene changes, it is effective to perform exception processing, in which, after excluding blank scenes, frames are retrieved for a duration of T sec. from the beginning of the dynamic image. Then, based on the pre-processing for obtaining the digest, frames are retrieved from the actual dynamic image data on the basis of the frame interval information, thereby producing the digest, after which processing ends.

Second Embodiment

Figure 10:
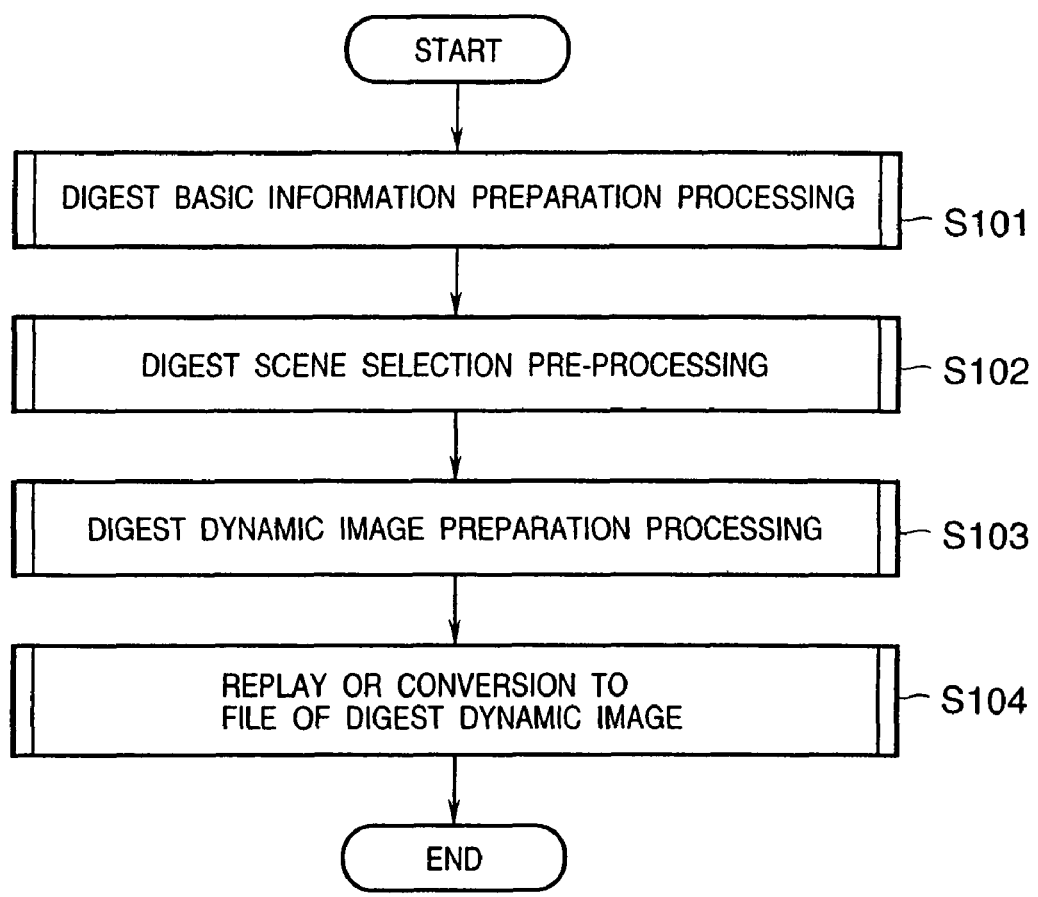
FIG. 10 is a flowchart showing in outline processing for automatic digest dynamic image preparation according to an embodiment of the present invention.

In the second embodiment, the image processing section 10 shown in FIG. 1 of the second embodiment above performs processing for automatic preparation of a digest dynamic image in accordance with the image processing algorithm shown in FIG. 10. FIG. 10 is a flowchart showing the general flow of processing for automatic digest dynamic image preparation according to the present embodiment.

In automatic digest dynamic image preparation processing according to the present embodiment, dynamic image information, to be viewed, is first selected and inputted through the image input section 20. Upon input of dynamic image information to be confirmed, the image processing section 10 begins processing for confirmation of the dynamic image, and proceeds to the processing shown in FIG. 10.

First, by performing the digest basic information preparation processing shown in step S101, basic information for preparing the digest is obtained. Next, in step S102, digest scene selection pre-processing is executed, in which scenes are selected for the digest of the dynamic image to be viewed by, for example, display on the display section 30.

Then, in step S103, processing for automatic digest dynamic image preparation is performed to prepare a digest dynamic image, which is, for example, stored in the image memory 60. Then, in step S104, processing for digest dynamic image replay or file conversion is performed, whereby the digest dynamic image is replayed and, for example, displayed on the display section 30, or converted into a file and outputted to the output section 40.

Figure 11:
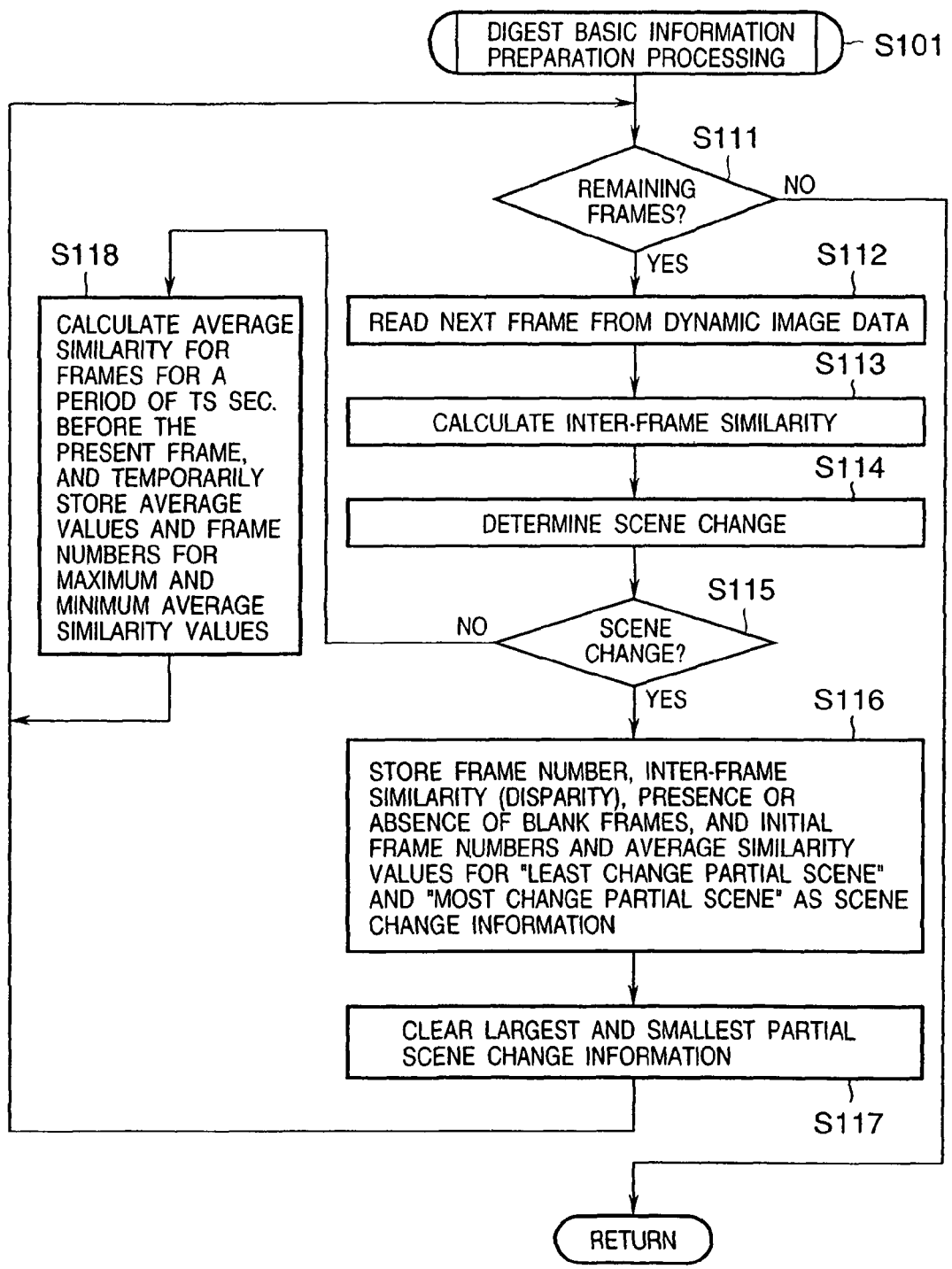
FIG. 11 is a flowchart showing the details of processing for the digest basic information preparation of step S101 in FIG. 10.

Next, the digest basic information preparation processing shown in step S101 will be explained in detail with reference to the flowchart in FIG. 11. FIG. 11 is a flowchart showing the details of the digest basic information preparation processing shown in step S101 of FIG. 10. Here, since the digest basic information preparation processing requires a comparatively long processing time, if it is performed, for example, at the time of recording the image in the image memory 60, real-time processing can be expedited, since the remainder of the processing is very simple.

First, in step S111, processing is performed to extract one frame at a time from the dynamic image for which a digest is to be prepared, and it is determined whether there are remaining frames to be processed. If there are no remaining frames, processing is ended and returns. If, on the other hand, there are remaining frames in step S111, processing proceeds to step S112.

In step S112, the next frame is read out from the dynamic image data. Then, in step S113, the inter-frame similarity calculating section 11 calculates the similarity between the read frame and the previous frame(s). The frame(s) preceding the read frame may be singular or plural, and thus the algorithm therefor is not particularly limited.

Then, in step S114, based on the inter-frame similarity calculation result, the scene change determining section 12 performs scene change determination processing. Then, if it is determined in step S115 that there was a scene change, processing proceeds to step S116, where that frame is stored as a scene initial frame, and information regarding the degree of similarity (or disparity), which represents the magnitude of the scene change, and regarding whether or not the scene is a blank scene, are also stored. This information is stored, for example, in the memory.

The foregoing information will be called "scene change information." FIG. 12 shows an example of scene change information. As shown in FIG. 12, initial frame, final frame, magnitude of scene change, etc. are stored in relation to each scene change number (scene change ID).

Specifically, the scene change information stores the frame numbers of the scene initial and scene final frames, the inter-frame similarity (disparity), presence of blank frames, and initial frame numbers and average similarity values for the "least change partial scene" and "most change partial scene" (to be discussed below).

Then, when the next scene change is detected, in the processing in step S116, the immediately preceding frame is incorporated in the scene change information as the final frame of the preceding scene. When processing has been performed to the end of the dynamic image, the frame number of the final frame of the dynamic image is stored as the final frame of the final scene change information.

After the processing in step S116 is completed, processing proceeds to step S117, where the largest and smallest partial scene change information at this point are cleared, and processing returns to step S111.

If in step S115 there was no scene change (i.e. during a scene), processing proceeds to step S118, where, from among frames for a period of TS seconds before the present frame, a frame interval (partial scene) for which the average value of similarity is maximum is calculated, and the initial frame of this partial scene and the average similarity value are stored in the scene change information shown in FIG. 12 as the "least change partial scene," and, from among the frames for the same period of TS seconds, a frame interval for which the average similarity value is minimum is calculated, and the initial frame and average similarity value are stored in the scene change information shown in FIG. 12 as the "most change partial scene."

In the present embodiment, an optimum partial scene duration from the scene change frame is determined as explained above, on the basis of human vision characteristics, so there will be no noticeable flicker. This duration is TS sec. The duration TS is based on various psychological experiments, and is not particularly limited, but is on the order of several seconds.

The foregoing digest basic information preparation processing is performed for all of the frames in the dynamic image, thus obtaining all of the scene change frames in the dynamic image and the similarity (disparity) which indicates the magnitude of each scene change, whether it is a blank scene, and initial frame numbers and average similarity values for the least change and most change partial scenes.

If the foregoing processing is performed at the time of registering the dynamic image to a dynamic image output device such as the display section 30, only the processing to be described below need be performed at the time of digest preparation. Thus digest generation is more convenient because it can be performed substantially in real time.

Figure 13:
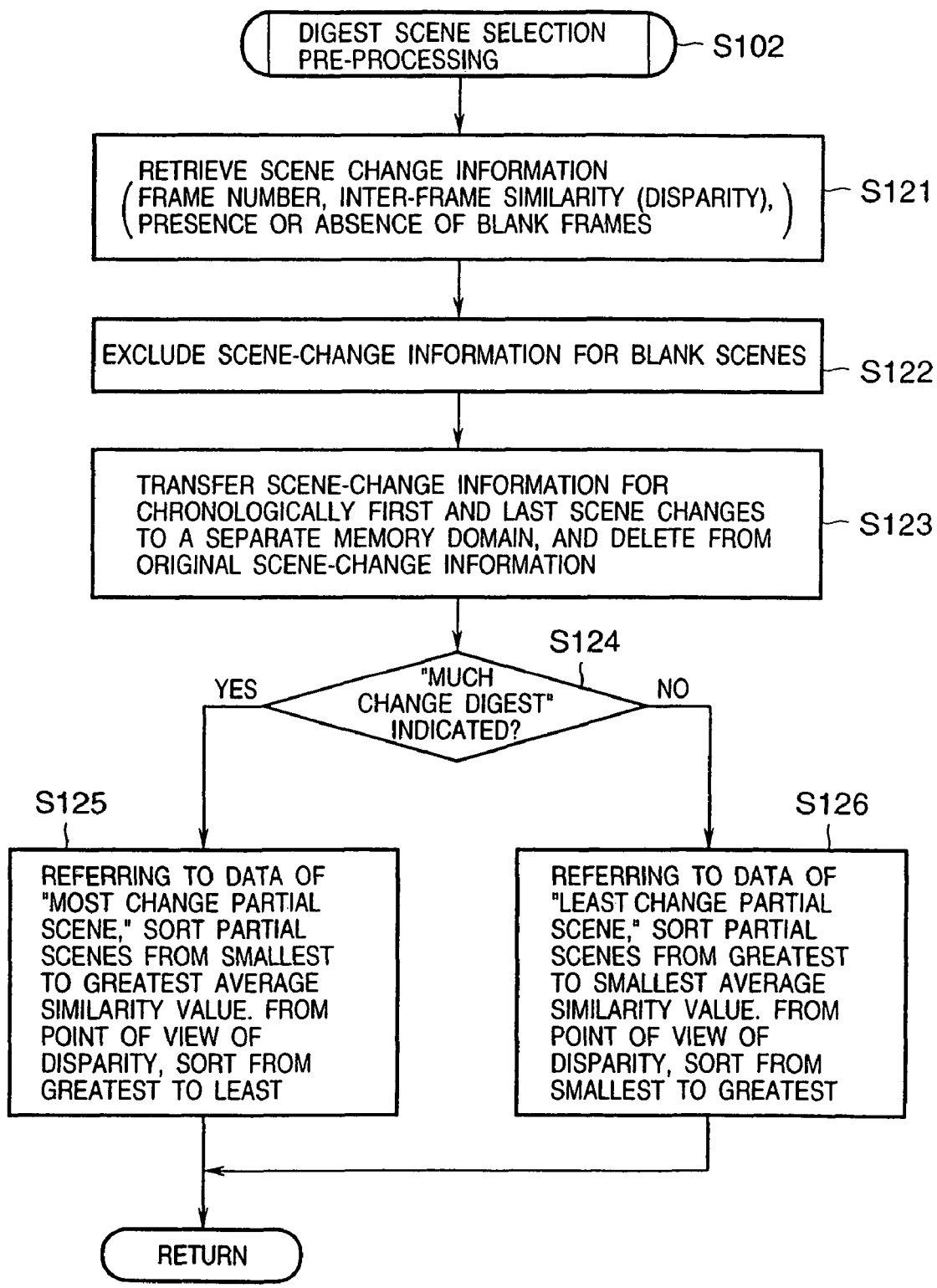
FIG. 13 is a flowchart explaining the details of the digest scene selection pre-processing of step S102 in FIG. 10.

Next, the digest scene selection pre-processing in step S102 in FIG. 10 will be explained in detail with reference to the flowchart in FIG. 13. FIG. 13 is a flowchart explaining the digest scene selection pre-processing shown in step S102 of FIG. 10.

The digest scene selection pre-processing is carried out in accordance with a digest dynamic image replay time specified by the user, and with the user's indication of "little change" or "much change digest." This processing does not require an especially large number of calculations, and although a memory domain in the image memory 60 is used to store sort information for both the "little change digest" and "much change digest," this processing can be carried out when registering the dynamic image to the output device such as the display section 30, thus further expediting automatic digest preparation in real time.

First, in step S121, the scene change information, which shows frame number, inter-frame similarity, whether or not there are blank frames, and initial frame numbers and average similarity values for the most static and most dynamic partial scenes, is retrieved. In the present embodiment, the digest duration specified at a higher level is TD sec., and either "prepare little change digest" or "prepare much change digest" is selected.

Then, in step S122, scene change information pertaining to blank scenes is excluded. Next, in step S123, of the remaining scene changes, the chronologically first and last scene changes are determined, and scene change information pertaining to the first and last scene changes are deleted from the foregoing remaining scene changes and stored in a separate domain.

Then, in step S124 it is determined whether or not the user specified a much change digest. If the user has selected "prepare much change digest," processing proceeds to step S125, where, referring to the data for the "most change partial scene," the partial scenes are sorted from smallest to greatest average similarity value. From the point of view of disparity, the partial scenes are sorted from greatest to least. Processing then returns.

On the other hand, if it was determined in step S124 that the user has selected "prepare little change digest," processing proceeds to step S126, where, referring to the data for the "least change partial scene," the partial scenes are sorted from greatest to smallest average similarity value. From the point of view of disparity, the partial scenes are sorted from smallest to greatest. Processing then returns.

The foregoing processing for blank scene deletion, determination of first and last scene changes chronologically and deleting scene change information pertaining thereto from the remaining scene changes and storing it in a separate domain, and sorting by similarity (or disparity) may of course be performed in parallel instead of as successive steps.

Figure 14:
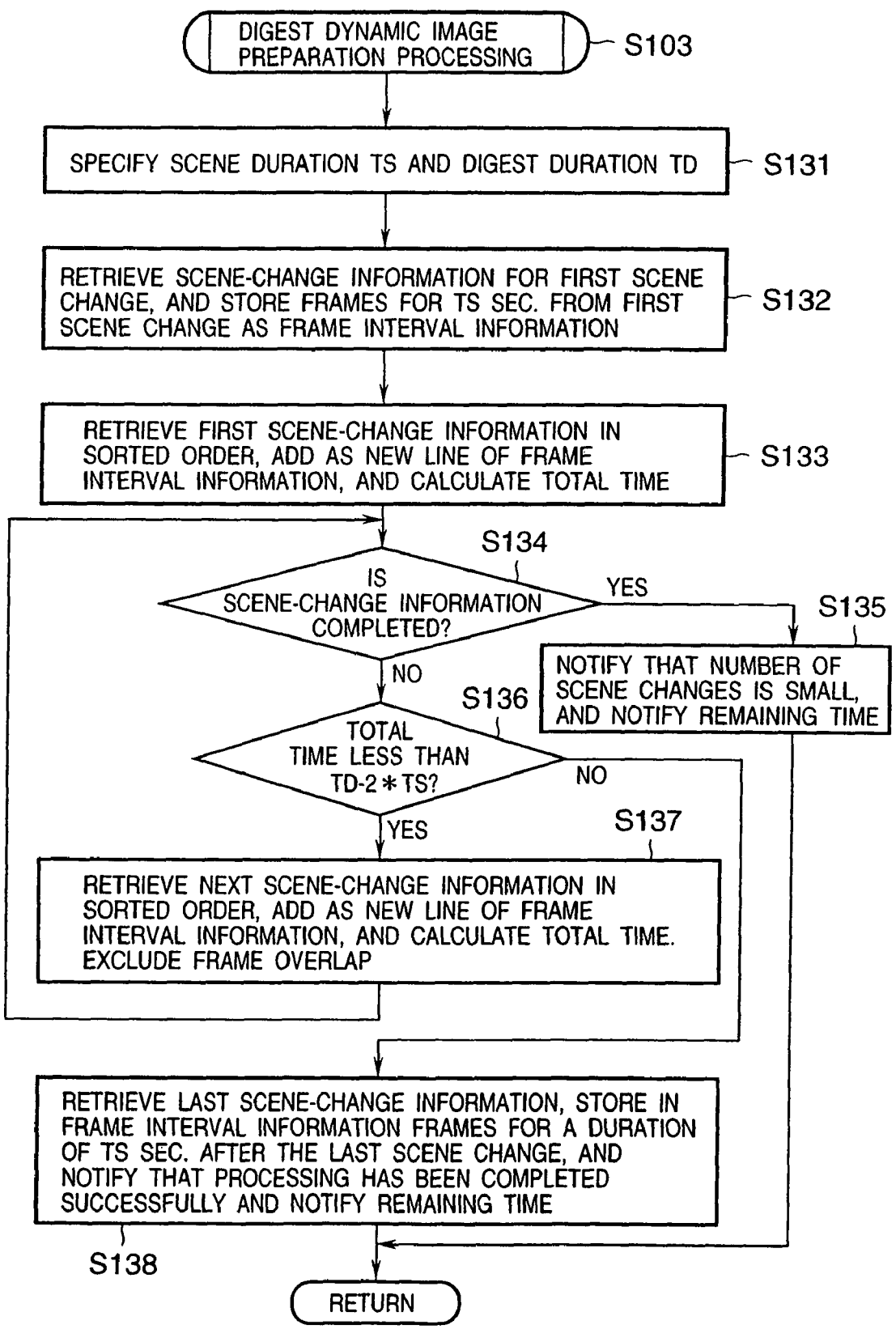
FIG. 14 is a flowchart explaining the details of processing for the automatic digest dynamic image preparation of step S103 in FIG. 10.

Next, the digest dynamic image preparation processing in step S103 shown in FIG. 10 will be explained, in detail, with reference to the flowchart in FIG. 14. FIG. 14 is a flowchart explaining the digest dynamic image preparation processing shown in step S103 of FIG. 10.

In the digest dynamic image preparation processing shown in FIG. 14, partial scenes are merged into a digest in accordance with the algorithm explained below. As intermediate information, frame interval information is prepared, and after a target duration has elapsed, digest scene selection pre-processing is ended, after which frames are selected based on the frame interval information and merged to generate the digest. Processing for making the digest the duration actually specified by the user (digest dynamic image frame interval information preparation processing) is carried out.

First, in step S131, the duration of each partial scene (TS) and the duration of the digest (TD) are specified. Then, in step S132, scene change information for the first scene change, previously stored in a separate domain, is retrieved, and frame interval information for frames from this first scene change for a duration of TS sec. is stored.

FIG. 15 shows one example of frame interval information. As shown in FIG. 15, each line of frame interval information is made up of an initial frame number corresponding to a unique scene number and scene change of the dynamic image, and a final frame number corresponding to the final frame of the scene TS sec. in duration.

Then, in step S133, using the sorted scene change information, the first scene change information in the sorted order is retrieved and added as a new line of frame interval information, and the total time is calculated. Then, in step S134, it is checked whether or not the end of the sorted series of scene change information has been reached. If the end of the sorted series of scene change information has been reached, processing proceeds to step S135, where it is detected that, since the number of scene changes is small, processing for adding scene changes to the frame interval information has been completed for every scene change, and a notification is made that the number of scene changes is small, and also specifying the number of seconds the digest actually reached (remaining time), after which processing returns.

If, in step S134, the end of the sorted series of scene change information has not been reached, processing proceeds to step S136, where it is checked whether or not the total duration is less than (TD)−(2×TS). If the total duration is less than (TD)−(2×TS), processing proceeds to step S137, where, using the sorted scene change information, partial scene information for the next partial scene in the sorted series is retrieved and added as a new line of frame interval information, after which the total time is calculated, and processing returns to step S134.

Figure 16:
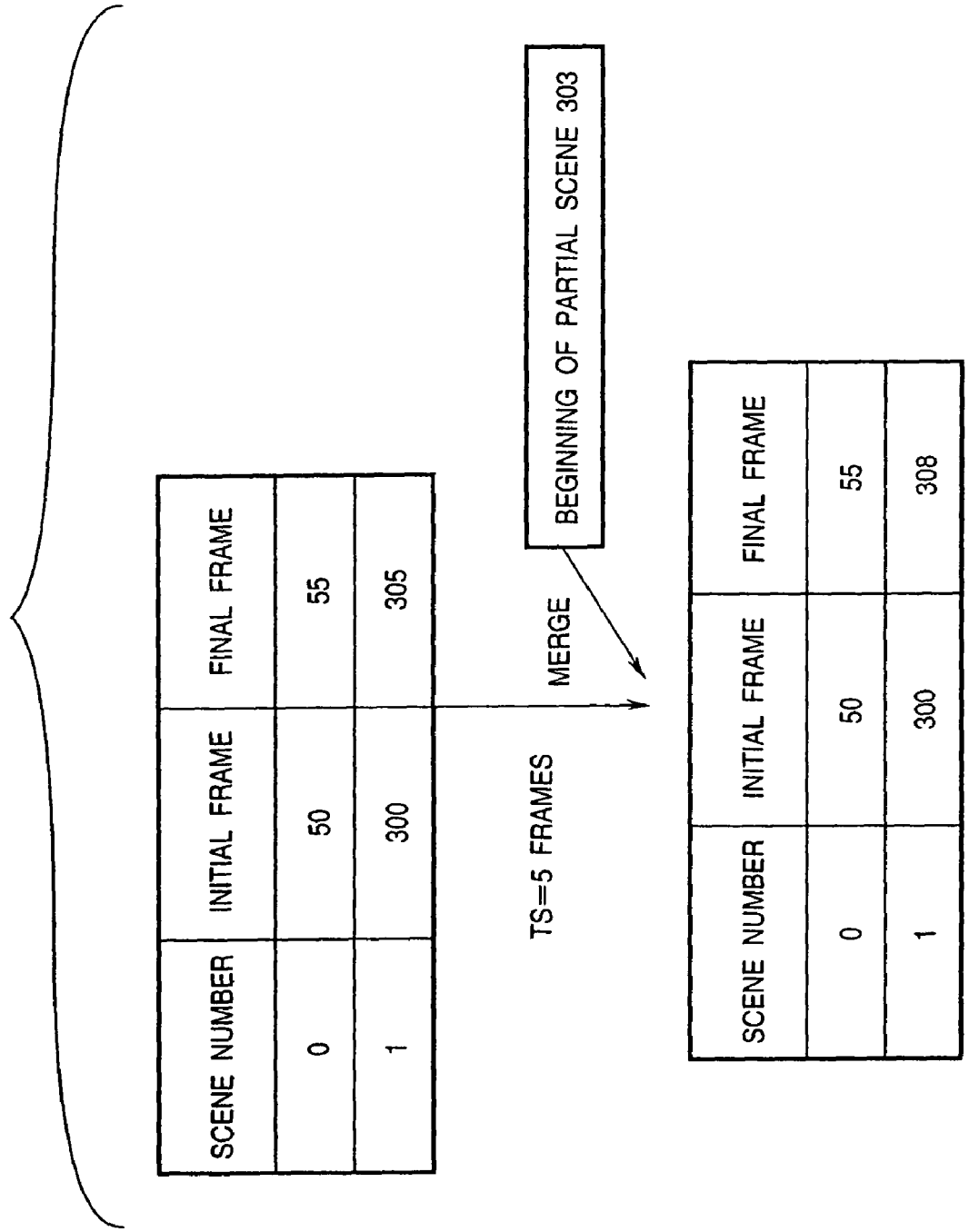
FIG. 16 is a drawing showing an example of updating frame interval information according to an embodiment of the present invention, in such a way as to eliminate scene overlap.
Figure 17:
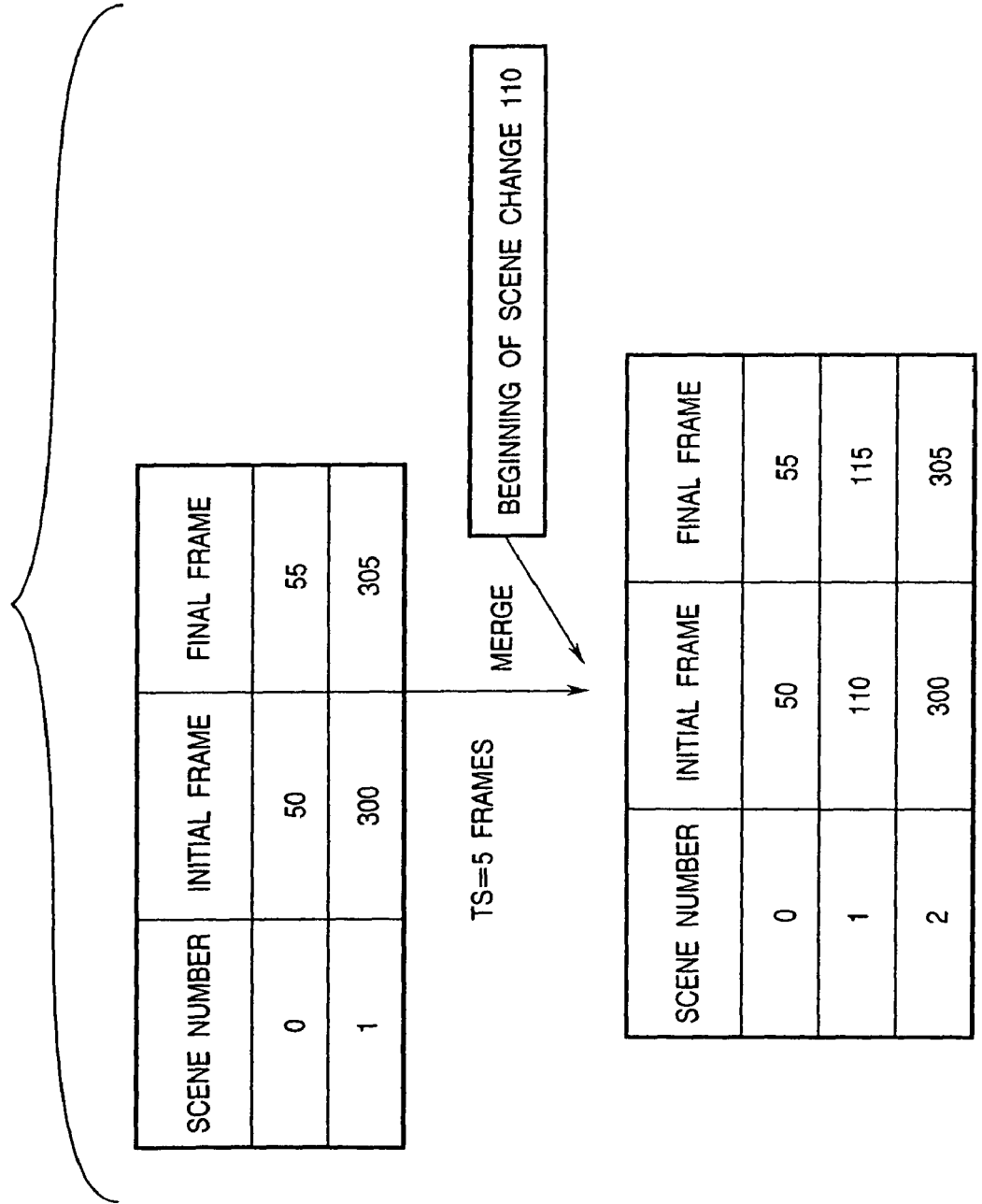
FIG. 17 is a drawing showing another example of updating frame interval information according to an embodiment of the present invention, in such a way as to eliminate scene overlap.

Incidentally, when adding to the frame interval information in the processing in step S137, frames overlapping with the frame interval information will occasionally be added. This happens, for example, when scene change frames of adjacent scenes are less than TS seconds apart. In such a case, the frame interval information is revised in such a way as to exclude scene overlap. An example is shown in FIG. 16.

Again, when the duration of a scene to be added to the frame interval information is less than TS sec., as shown in FIG. 8, only frames through the final frame in the scene are added.

The duration of the digest as specified at a higher level is TD sec., and the processing of steps S24 through S27 is carried out as long as the total time occupied by the frames of the frame interval information does not exceed (TD−TS) sec. Then, when the total time exceeds (TD)−(2×TS), processing proceeds from step S136 to step S138, after which the final scene change information previously stored elsewhere is retrieved, and frames from the beginning of the final scene change for a duration of TS sec. are added to the frame interval information. Then a notification is made that processing has been successful, and also specifying the time remaining, after which processing returns.

In the foregoing explanation, when the digest is short because the number of scene changes is small, if the total duration of the digest is at least a threshold value TH seconds shorter than TD seconds, the digest dynamic image preparation processing shown in FIG. 14 may be repeated gradually increasing the duration TS of each partial scene, thereby bringing the total duration of the digest closer to a specified duration. Even if processing is repeated in this way, the number of calculations can be held to a minimum if the foregoing control is performed, and thus no problems will arise.

Further, even if there are no scene changes, it is effective to perform exceptional processing, in which, after excluding blank scenes, frames are retrieved for a duration of T sec. from the beginning of the dynamic image.

Figure 18:
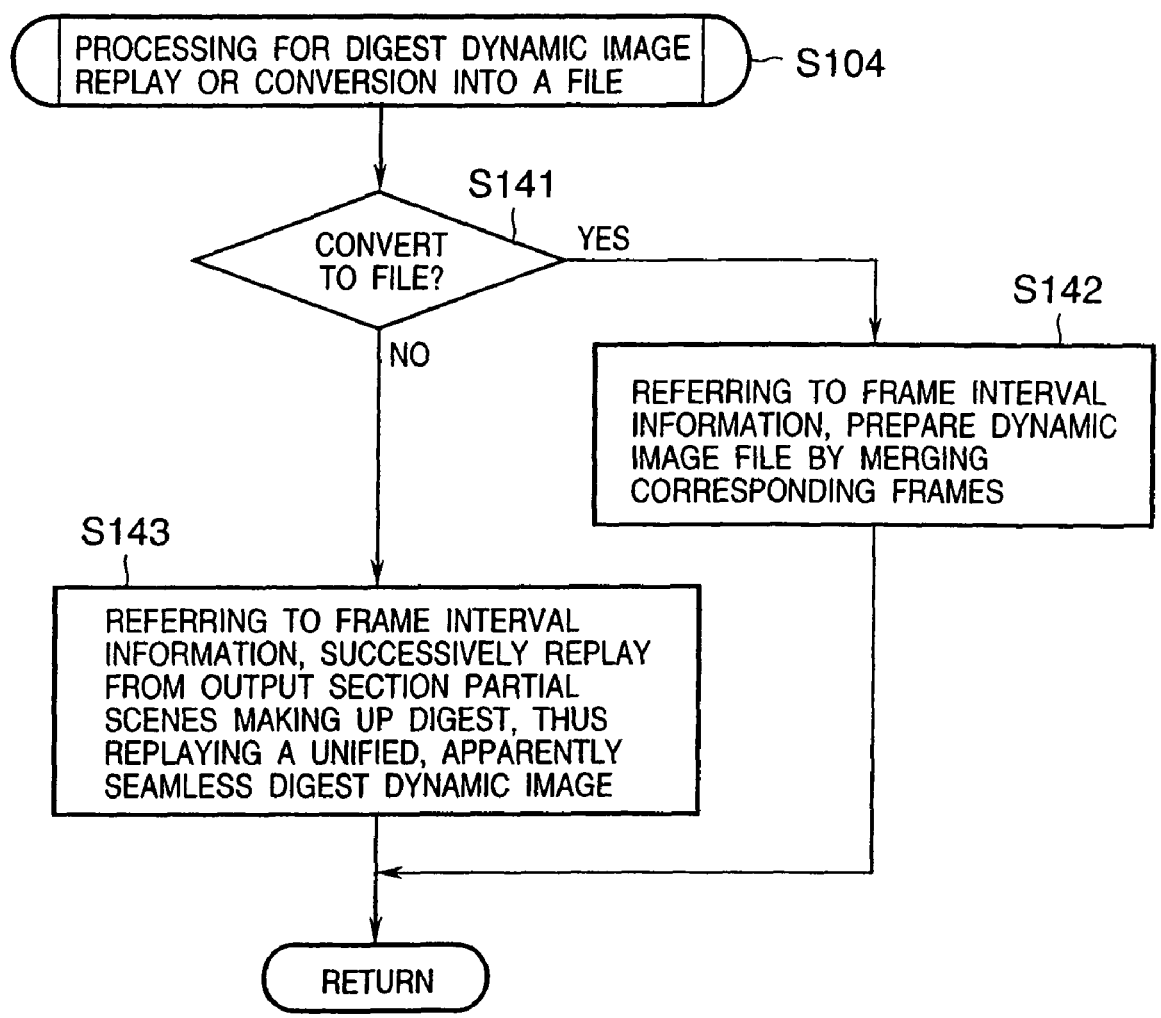
FIG. 18 is a flowchart showing the details of processing for the digest dynamic image replay or filing of step S104 in FIG. 10.

Finally, the digest dynamic image replay or file preparation shown in step S104 in FIG. 10 will be explained in detail with reference to the flowchart in FIG. 18. FIG. 18 is a flowchart showing the details of the digest dynamic image replay or file preparation shown in step S104 in FIG. 10.

First, in step S141, it is determined whether to replay the digest dynamic image or prepare a file thereof. When a file is to be prepared, processing proceeds to step S142, where, with reference to the frame interval information, the corresponding frames are merged to create a dynamic image file, and processing returns.

When, in step S141, the digest dynamic image is to be replayed, processing proceeds to step S143, where, based on the pre-processing for obtaining the digest, frames are extracted from the dynamic image data on the basis of the frame interval information, and the extracted partial scenes making up the digest are successively replayed using, e.g. an image writing function of the output section 40, thus replaying an apparently unified digest dynamic image. Then processing returns.

In the present embodiment, the digest, obtained from frame interval information obtained by digest dynamic image preparation processing, is thus converted into a file or temporarily replayed at high speed on the basis of the frame information for the partial scenes making up the digest.

When the digest dynamic image is to be converted into a single unified piece of binary data, image frames are successively appended on the basis of the frame interval information obtained by the preceding processing, to prepare a dynamic image in, for example, the AVI format.

However, the present embodiment is not limited to this example, and if instead of converting the digest dynamic image into a single unified piece of binary data, the digest is merely to be replayed, it is also possible, upon completion of the partial scene information for preparation of the digest, instead of processing for merging the partial scenes, to successively replay the partial scenes using a dynamic image display API (such as Active Movie) of the computer's OS (such as Windows (registered trademark)), thus causing the partial scenes to appear as a single seamless digest dynamic image.

Third Embodiment

The following will explain the foregoing processing following the flow of the actual processing.

Figure 9:
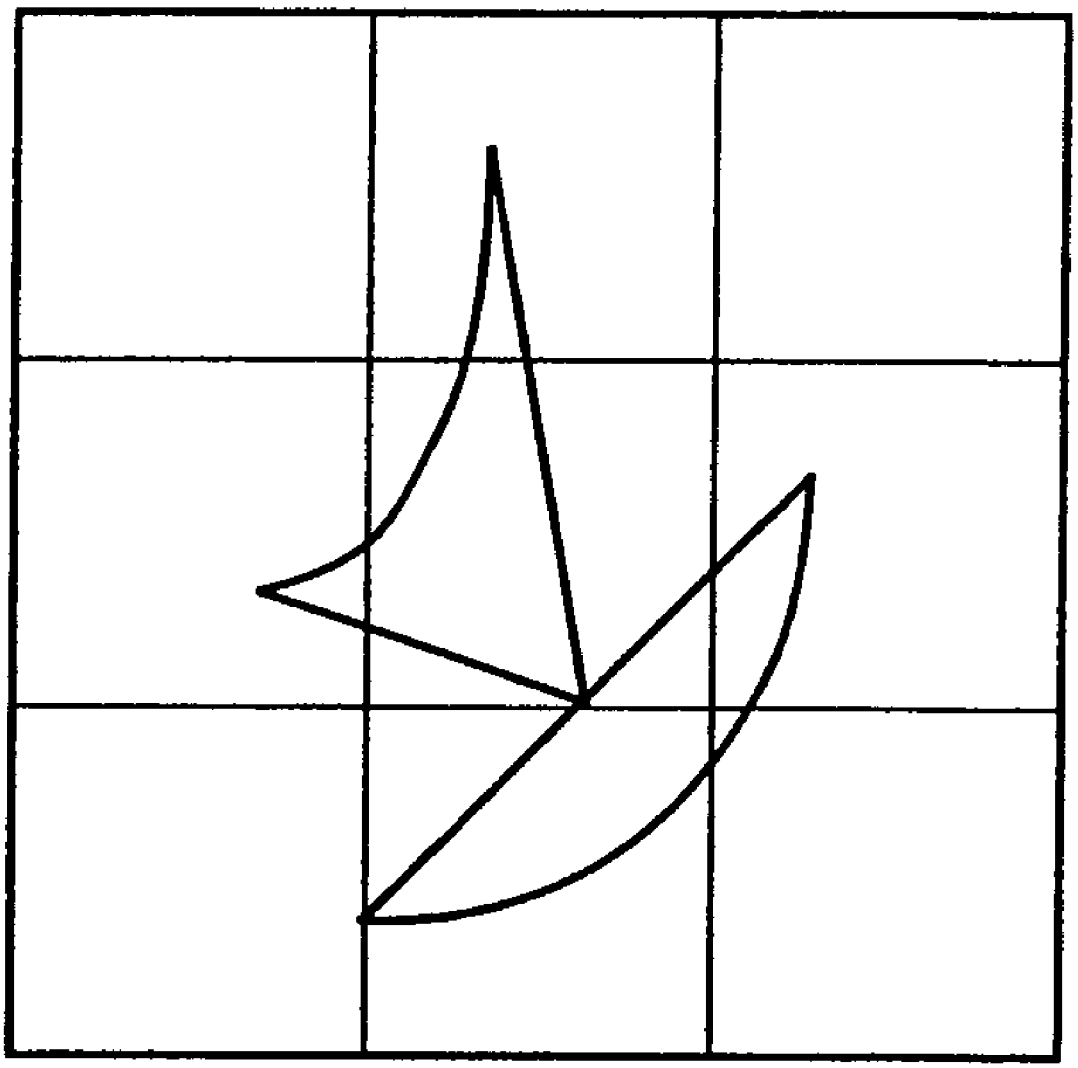
FIG. 9 is a drawing showing an example of dividing a frame into a plurality of blocks according to an embodiment of the present invention.

To take a simple embodiment, the present frame and the preceding frame are each divided into a plurality of blocks horizontally and vertically, as shown in FIG. 9, and an RGB average value is calculated for each block, and the sum of squares of the difference in each channel R, G, and B of corresponding blocks of the present and preceding frames is treated as the frame disparity, which expresses the magnitude of scene changes. The smaller the frame disparity, the more similar the frames, and the larger, the less similar, i.e., the more likely that it is a scene change.

The following shows one example of an equation for making the above calculation.

$$\sum_{i=1}^{k} \{(P1_{iR} - P2_{iR})^2 + (P1_{iG} - P2_{iG})^2 + (P1_{iB} - P2_{iB})^2\} \quad \text{[EQUATION 1]}$$

Here, i: shows the block being processed;
K: number of blocks into which frame is divided;
P1iR: average value for R channel of ith block of preceding frame;
P1iG: average value for G channel of ith block of preceding frame;
P1iB: average value for B channel of ith block of preceding frame;
P2iR: average value for R channel of ith block of present frame;
P2iG: average value for G channel of ith block of present frame; and
P2iB: average value for B channel of ith block of present frame.

Detection of blank frames can be performed using Equation 1 above by, for example, judging as blank frames for which the sum of squares of the difference of each R, G, and B channel is 0 or is less than a predetermined threshold value. Alternatively, blank scenes may be detected by using as a standard whether the average value for each of the R, G, and B channels for the present frame is 0 or 1, or exceeds or is less than a fixed threshold.

Based on the results of inter-frame similarity calculation, the scene change determining section 12 determines whether or not there has been a scene change, and when it is determined there was a scene change, that scene is stored in memory as a scene initial frame, along with a scene change ID number, and the similarity (or disparity), which expresses the magnitude of the scene change, and whether or not the scene is a blank scene, are also stored (scene change information).

Further, when the next scene change is detected, the immediately preceding frame is added to the scene change information as the final frame of the preceding scene. When processing has been performed to the end of the dynamic image, the frame number of the final frame of the dynamic image is stored as the final frame of the final scene change information. An example of scene change information is shown in FIG. 5, discussed above. Further, an optimum partial scene duration from the scene change frame is determined on the basis of human vision characteristics, so there will be no noticeable flicker. This duration is TS sec. The duration TS is based on various psychological experiments, and is not particularly limited, but is on the order of several seconds; as a result of experiments, it was found that good results were obtained using a value of approximately 2 sec. Then frames for TS sec. from the first scene change previously stored in a separate domain, are stored as frame interval information.

Within a scene, a frame interval of TS sec. for which the average similarity value is maximum is calculated as the "least change partial scene," and the initial frame of that partial scene and the average similarity value are stored in the scene change information shown in FIG. 12, and a frame interval of TS sec. for which the average similarity value is minimum is calculated as the "most change partial scene," and the initial frame of that partial scene and the average similarity value are stored in the scene change information shown in FIG. 12.

The foregoing processing is performed for every frame of the dynamic image, and as a result, every scene change frame of the dynamic image can be obtained, as well as the similarity (or disparity), which expresses the magnitude of the scene change, whether it is a blank scene, and the initial frames and average similarity values for the least change and most change partial scenes are obtained.

If the foregoing processing is performed at the time of storing the dynamic image in the image memory 60, only the processing to be described below need be performed at the time of digest preparation. Thus digest generation is more convenient because it can be performed substantially in real time.

Further, in the digest scene selection pre-processing shown in FIG. 3 or FIG. 13, scene change information for blank scenes is excluded from the scene change information, and then, of the remaining scene changes, the chronologically first and last scene changes are determined, and scene change information pertaining to the first and last scene changes are deleted from the foregoing remaining scene changes and stored in a separate domain.

Next, based on the results of sorting the scene change information by magnitude of scene change, frames for a duration of T sec. from each scene change are merged into the frame interval information in order from greatest to least magnitude of scene change.

When adding to the frame interval information, frames overlapping with the frame interval information will occasionally be added. This happens, for example, when scene change frames of adjacent scenes are less than TS seconds apart. In such a case, the frame interval information is revised in such a way as to present scene overlap.

Then, if the user has selected "prepare little change digest," referring to the data for the "least change partial scene," the partial scenes are sorted from greatest to smallest average similarity value. From the point of view of disparity, the partial scenes are sorted from least to greatest.

If, on the other hand, the user has selected "prepare much change digest," referring to the data for the "most change partial scene," the partial scenes are sorted from smallest to greatest average similarity value. From the point of view of disparity, the partial scenes are sorted from greatest to least.

In the digest moving image frame interval information preparation processing shown in FIG. 14, an optimum scene duration from the scene change frame is determined on the basis of human vision characteristics. Then, frame interval information is stored for frames for TS sec. from the first scene change, previously stored in a separate domain.

The frame interval information shown in FIG. 4 or FIG. 12 is made up of an initial frame number corresponding to a unique scene number and scene change of the dynamic image, a final frame number corresponding to the final frame of the scene, and inter-frame similarity. Accordingly, the partial scenes can be merged into a digest in accordance with the following algorithm, but in the present embodiment, frame interval information is prepared as intermediate information, and when a target duration has elapsed, digest scene selection pre-processing is ended, and the digest is prepared by retrieving and merging frames on the basis of the actual frame interval information.

Conventionally, to determine whether or not a dynamic image is one the viewer wishes to view, it was necessary to perform accelerated replay, or to fast-forward and then replay, which were inconvenient for the user, but in the present embodiment as explained above, it is possible to automatically prepare a digest of high quality, and it can be determined instantly whether the dynamic image is one the viewer wishes to view. Further, since it is possible to set a limit on the length of the digest dynamic image, use on multiple levels becomes possible. For instance, if the viewer is interested, it is possible to prepare and view a longer digest dynamic image before deciding.

Further, since a target duration for the digest dynamic image can be set, it is possible to prepare a digest dynamic image which can be stored even when there are limitations on the size of a dynamic image data header or a data domain of the memory medium.

Fourth Embodiment

In the foregoing embodiments, scene changes were detected using the sum of squares of differences between the present and immediately preceding frames in R, G, and B channel values for average colors, but there is no particular limitation to this algorithm. Further, the foregoing embodiments explained a method in which frames for, for example, 2 sec. from each scene change were synthesized into a digest, but there is no particular limitation on this duration.

The present invention may be applied to a system made up of a plurality of devices (for example, host computer, interface device, reader, printer, etc.), or to a single device (for example, a copy machine, facsimile device, etc.).

Further, the object of the present invention can of course be achieved by supplying a memory medium (or recording medium) recording the program code of software realizing the functions of the foregoing embodiments to a system or device, and having a computer (or CPU, MPU, etc.) of the system or device read out and execute the program code stored in the memory medium. In such a case, it is the program code read out of the memory medium which realizes the functions of the foregoing embodiments, and the memory medium recording the program code makes up the present invention. Further, it also goes without saying that such a case includes not only cases in which the functions of the foregoing embodiments are realized by a computer executing the program code it has read out, but also cases in which the functions of the foregoing embodiments are realized by processing carried out in whole or in part by an operating system (OS) operating in the computer based on the instructions of the program code.

Moreover, it also goes without saying that the foregoing case also includes a case in which the program code read out from the memory medium is stored in a memory provided in an expansion card inserted in the computer or an expansion device connected to the computer, after which the functions of the foregoing embodiments are realized by processing carried out in whole or in part by a CPU, etc. of the expansion card or expansion device based on the instructions of the program code.

When the present invention is applied to such a memory medium, the memory medium stores program code corresponding to the flowcharts explained above (shown in FIGS. 2, 3, 4, 10, 11, 13, 14, and 18).

As discussed above, with the present invention it is possible to automatically prepare a digest of high quality, in order to determine instantly whether or not the dynamic image is one the viewer wishes to view. Further, in systems or software which require setting a limit to the length of the digest moving image, a target duration for the digest dynamic image can be set, and thus it is possible to prepare a digest dynamic image which can be stored even when there are limitations on the size of a dynamic image data header or a data domain of the memory medium.

Further, with the present invention, by linking image feature calculation with human sensitivities, it is possible to automatically prepare a digest dynamic image in accordance with user desires such as "little change" and "much change."

As many apparently widely different embodiments of the present invention can be made without departing from the spirit and scope thereof, it is to be understood that the invention is not limited to the specific embodiments thereof except as defined in the claims.

What is claimed is:

1. An image processing system comprising:
   a calculating unit configured to calculate a degree of similarity from among a plurality of image frames of image data;
   a determining unit configured to determine scene-change frames based on the degree of similarity calculated by said calculating unit;
   a digest image preparation unit configured to perform automatic editing and preparation of a digest image of the image data, by merging a specified duration of frames having a low degree of similarity with an immediately preceding frame or some preceding frames;
   a reception unit configured to receive, from a user, an instruction of an entire time of the digest image to be prepared by merging the duration of frames, and
   a time calculation unit configured to calculate a total time of the durations of frames to be merged before completion of merging the frames;
   wherein said digest image preparing unit is further configured to preferentially merge the duration of frames having a lower degree of similarity and to adjust the number of the duration of frames to be merged, in order to automatically prepare the digest image having the entire time specified in the instruction received by said reception unit by merging the durations of frames in the order of the degree of similarity from the duration having the lowest degree of similarity, until the total time calculated for the merging result becomes substantially the same as the entire time.

2. The image processing system according to claim 1, further comprising:
   a detecting unit configured to detect blank scenes; and
   an exception processing unit configured to perform exception processing in which an initial image frame after exclusion of a blank scene detected at the beginning of the digest image by said detecting unit is deemed a scene-change frame.

3. The image processing system according to claim 2, wherein said exception processing unit also performs exception processing in which a final image frame after exclusion of a blank scene detected at the end of the digest image by said detecting unit is deemed a scene-change frame.

4. The image processing system according to claim 3, wherein when a time duration for each scene-change frame of two scenes in close proximity is less than the specified duration, frame information from a scene-change frame of the first scene and frame information through a frame from the scene-change frame of the second scene are treated as the result of merging of the scene-change frames of the two scenes into one scene whose duration is equal to the specified duration.

5. The image processing system according to claim 4, wherein when the duration of the scene-change frame of the second scene to be merged falls within a specified duration of the scene-change frame of the first scene, all the frame information of the scene-change frame of the second scene are merged with the scene-change frame of the first scene.

6. The image processing system according to claim 1, wherein a user is able to select and specify whether to save a digest as a file, or replay the digest and discard the data.

7. The image processing system according to claim 2, wherein a user is able to select and specify whether to save a digest as a file, or replay the digest and discard the data.

8. The image processing system according to claim 3, wherein a user is able to select and specify whether to save a digest as a file, or replay the digest and discard the data.

9. The image processing system according to claim 4, wherein a user is able to select and specify whether to save a digest as a file, or replay the digest and discard the data.

10. The image processing system according to claim 5, wherein a user is able to select and specify whether to save a digest as a file, or replay the digest and discard the data.

11. The image processing system according to claim 1, wherein said image preparation unit is further configured to perform automatic editing and preparation of a digest image of the image data by merging a specified duration of frames having a high degree of similarity with an immediately preceding frame or some preceding frames, on receipt of instructions to prepare a second type of digest image.

12. An image processing system comprising:
   a calculating unit configured to calculate a degree of similarity from among a plurality of image frames of image data;
   a determining unit configured to determine scene-change frames based on the degree of similarity calculated by said calculating unit;
   a digest image preparation unit configured to perform automatic editing and preparation of a digest image of the image data, by merging a specified duration of frames having a high degree of similarity with an immediately preceding frame or some preceding frames;

a reception unit configured to receive, from a user, an instruction of an entire time of the digest image to be prepared by merging the duration of frames, and time calculation unit configured to calculate a total time of the durations of frames to be merged before completion of merging the frames;

wherein said digest image preparing unit is further configured to preferentially merge the duration of frames having a higher degree of similarity and to adjust the number of the duration of frames to be merged, in order to automatically prepare the digest image having the entire time specified in the instruction by said reception unit, by merging the durations of frames in the order of the degree of similarity from the duration having the highest degree of similarity, until the total time calculated for the merging result becomes substantially the same as the entire time.

13. The image processing system according to claim 12, further comprising:

a detecting unit configured to detect blank scenes; and an exception processing unit configured to perform exception processing in which an initial image frame after exclusion of a blank scene detected at the beginning of the digest image by said detecting unit is deemed a scene-change frame.

14. The image processing system according to claim 13, wherein said exception processing unit also performs exception processing in which a final image frame after exclusion of a blank scene detected at the end of the digest image by said detecting unit is deemed a scene-change frame.

15. The image processing system according to claim 14, wherein when a time duration for each scene-change frame of two scenes in close proximity is less than the specified duration, frame information from a scene-change frame of the first scene and frame information through a frame from the scene-change frame of the second scene are treated as the result of merging of the scene-change frames of the two scenes into one scene whose duration is equal to the specified duration.

16. The image processing system according to claim 15, wherein when the duration of the scene-change frame of the second scene to be merged falls within a specified duration of the scene-change frame of the first scene, all the frame information of the scene-change frame of the second scene are merged with the scene change frame of the first scene.

17. The image processing system according to claim 12, wherein a user is able to select and specify whether to save a digest as a file, or replay the digest and discard the data.

18. The image processing system according to claim 13, wherein a user is able to select and specify whether to save a digest as a file, or replay the digest and discard the data.

19. The image processing system according to claim 14, wherein a user is able to select and specify whether to save a digest as a file, or replay the digest and discard the data.

20. The image processing system according to claim 15, wherein a user is able to select and specify whether to save a digest as a file, or replay the digest and discard the data.

21. The image processing system according to claim 16, wherein a user is able to select and specify whether to save a digest as a file, or replay the digest and discard the data.

22. An image processing method comprising the steps of:

calculating a degree of similarity from among a plurality of image frames of image data;

determining scene-change frames based on the calculated degree of similarity;

performing automatic editing and preparation of a digest image of the image data, by merging from each scene delimited by a scene change a specified duration of frames having a low degree of similarity with an immediately preceding frame or some preceding frames;

receiving, from a user, an instruction of an entire time of the digest image to be prepared by merging the duration of frames, and calculating a total time of the durations of frames to be merged before completion of merging the frames;

wherein, in said performing step, the duration of frames having a lower degree of similarity is preferentially merged and the number of the duration of frames to be merged is adjusted in order to automatically prepare the digest image having the entire time specified in the instruction received in said receiving step, by merging the durations of frames in the order of the degree of similarity from the duration having the lowest degree of similarity, until the total time calculated for the merging result becomes substantially the same as the entire time.

23. The image processing method according to claim 22, further comprising the steps of:

detecting blank scenes; and performing exception processing in which an initial image frame after exclusion of a blank scene detected at the beginning of the digest image in said detecting step is deemed a scene-change frame.

24. The image processing method according to claim 23, further comprising the step of:

performing exception processing in which a final image frame after exclusion of a blank scene detected at the end of the digest image in said detecting step is deemed a scene-change frame.

25. The image processing method according to claim 24, wherein when a time duration for each scene-change frame of two scenes in close proximity is less than the specified duration, frame information from a scene-change frame of the first scene and frame information through a frame from the scene-change frame of the second scene are treated as the result of merging of the scene-change frames of the two scenes into one scene whose duration is equal to the specified duration.

26. The image processing method according to claim 25, wherein when the duration of the scene-change frame of the second scene to be merged falls within a specified duration of the scene-change frame of the first scene, all the frame information of the scene-change frame of the second scene are merged with the scene-change frame of the first scene.

27. The image processing method according to claim 22, wherein, in said performing step, automatic editing and preparation of a digest image of the image data are performed by merging a specified duration of frames having a high degree of similarity with an immediately preceding frame or some preceding frames, on receipt of instructions to prepare a second type of digest image.

28. An image processing method comprising the steps of:

calculating a degree of similarity from among a plurality of image frames of image data;

determining scene-change frames based on the calculated degree of similarity;

performing automatic editing and preparation of a digest image of the image data, by merging from each scene delimited by a scene change a specified duration of frames having a high degree of similarity with an immediately preceding frame or some preceding frames receiving, from a user, an instruction of an entire time for the digest image to be prepared by merging the duration of frames; and calculating a total time of the durations of frames to be merged before completion of merging the frames;

wherein, in said performing step, the duration of frames having a higher degree of similarity is preferentially merged and the number of the duration of frames to be merged is adjusted in order to automatically prepare the digest image having the entire time specified in the instruction received by said reception step, by merging the durations of frames in the order of the degree of similarity from the duration having the highest degree of similarity, until the total time calculated for the merging result becomes substantially the same as the entire time.

29. The image processing method according to claim 28, further comprising the steps of:
    detecting blank scenes; and
    performing exception processing in which an initial image frame after exclusion of a blank scene detected at the beginning of the digest image in said detecting step is deemed a scene-change frame.

30. The image processing method according to claim 29, further comprising the step of:
    performing exception processing in which a final image frame after exclusion of a blank scene detected at the end of the digest image in said detecting step is deemed a scene-change frame.

31. The image processing method according to claim 30, wherein when a duration for each between scene-change frame of two scenes in close proximity is less than the specified duration, frame information from a scene-change frame of the first scene and frame information through a frame from the scene-change frame of the second scene are treated as the result of merging of the scene-change frames of the two scenes into one scene whose duration is equal to the specified duration.

32. The image processing method according to claim 31, wherein when the duration of the scene-change frame of the second scene to be merged falls within a specified duration of the scene-change frame of the first scene, all the frame information of the scene-change frame of the second scene are merged with the scene-change frame of the first scene.

33. A non-transitory computer-readable recording medium recording program code of an image processing method comprising the steps of:
    calculating a degree of similarity from among a plurality of image frames of image data;
    determining scene-change frames based on the calculated degree of similarity;
    performing automatic editing and preparation of a digest image of the image data, by merging from each scene delimited by a scene change a specified duration of frames having a low degree of similarity with an immediately preceding frame or some preceding frames;
    receiving, from a user, an instruction of an entire time of the digest image to be prepared by merging the duration of frames, and
    calculating a total time of the durations of frames to be merged before completion of merging the frames;
    wherein, in said performing step, the duration of frames having a lower degree of similarity is preferentially merged and the number of the duration of frames to be merged is adjusted in order to automatically prepare the digest image having the entire time specified in the instruction received in said receiving step, by merging the durations of frames in the order of the degree of similarity from the duration having the lowest degree of similarity, until the total time calculated for the merging result becomes substantially the same as the entire time.

34. The computer-readable recording medium according to claim 33, wherein, in said performing step, automatic editing and preparation of a digest image of the image data are performed by merging a specified duration of frames having a high degree of similarity with an immediately preceding frame or some preceding frames, on receipt of instructions to prepare a second type of digest image.

35. A non-transitory computer-readable recording medium recording program code of an image processing method comprising the steps of:
    calculating a degree of similarity from among a plurality of image frames of image data;
    determining scene-change frames based on the calculated degree of similarity;
    performing automatic editing and preparation of a digest image of the image data, by merging from each scene delimited by a scene change a specified duration of frames having a high degree of similarity with an immediately preceding frame or some preceding frames;
    receiving, from a user, an instruction of an entire time of the digest image to be prepared by merging the duration of frames, and
    calculating a total time of the durations of frames to be merged before completion of merging the frames;
    wherein, in said performing step, the duration of frames having a higher degree of similarity is preferentially merged and the number of the duration of frames to be merged is adjusted in order to automatically prepare the digest image having the entire time specified in the instruction received in said receiving step by merging the durations of frames in the order of the degree of similarity from the duration having the highest degree of similarity, until the total time calculated for the merging result becomes substantially the same as the entire time.

* * * * *